United States Patent [19]

Wu et al.

[11] 4,414,366

[45] * Nov. 8, 1983

[54] LOW COLOR COMPOSITIONS COMPRISING A CROSS-LINKED POLYCYANURATE POLYMER AND A THERMOPLASTIC POLYMER

[75] Inventors: Tse C. Wu; Dusan C. Prevorsek; David H. Wertz, all of Morristown, N.J.

[73] Assignee: Allied Corporation, Morris Township, Morris County, N.J.

[ * ] Notice: The portion of the term of this patent subsequent to Jun. 8, 1999 has been disclaimed.

[21] Appl. No.: 384,857

[22] Filed: Jun. 4, 1982

Related U.S. Application Data

[63] Continuation-in-part of Ser. No. 213,530, Dec. 5, 1980, Pat. No. 4,334,045.

[51] Int. Cl.³ .................... C08L 69/00; C08L 67/02
[52] U.S. Cl. .................... 525/439; 427/379; 525/452; 525/535; 260/DIG. 35
[58] Field of Search ............... 525/439, 440, 452, 535; 427/379; 260/DIG. 35

[56] References Cited

U.S. PATENT DOCUMENTS

| | | | |
|---|---|---|---|
| 3,840,578 | 10/1974 | Hennig | 260/453 SP |
| 4,026,913 | 5/1977 | Tanigaichi et al. | 260/463 |
| 4,046,796 | 9/1977 | Rotloff et al. | 260/463 X |
| 4,157,360 | 6/1979 | Prevorsek et al. | 260/860 |

OTHER PUBLICATIONS

V. V. Korshak et al., Vysokomol, Soyed A16, No. 1, pp. 15-23, 1974 (esp. p. 17).
V. V. Korshak et al. pp. 23-27 (esp. p. 29).
V. V. Korshak et al. vol. 202, No. 2, pp. 347-350 (1972).

*Primary Examiner*—Theodore E. Pertilla
*Attorney, Agent, or Firm*—Alan M. Doernberg; Gerhard H. Fuchs; Roy H. Massengill

[57] ABSTRACT

Purified aromatic dicyanates are cured with a catalyst which is an Mn(II), Ag(II), Fe(III), Bi(III), In(III) or Hf(IV) salt at 150°-200° C. and then at 200°-300° C. for a time sufficient to cure the dicyanate without causing color formations to the extent of a Yellowness Index over 30. In some forms the dicyanate is combined with the catalyst and a thermoplastic.

18 Claims, No Drawings

LOW COLOR COMPOSITIONS COMPRISING A CROSS-LINKED POLYCYANURATE POLYMER AND A THERMOPLASTIC POLYMER

CROSS-REFERENCE TO RELATED APPLICATION

This is a continuation-in-part of Ser. No. 213,530, filed Dec. 5, 1980 now U.S. Pat. No. 4,334,045.

BACKGROUND OF THE INVENTION

Aromatic dicyanates are a known class of thermosetting monomers which trimerize on heating and/or upon the action of a variety of catalysts to form branched polymers having s-triazine linkages (sometimes called polycyanurates or cross-linked cyanurates). Such aromatic dicyanates, including 2,2-bis(4-cyanatophenyl) propane [dicyanato derivative of bisphenol A or bisphenol A dicyanate or BCP], are commercially available in moderately pure forms as monomers or oligomers with molecular weights of about 2000. A representative process for preparing such monomers is described in U.S. Pat. No. 4,046,796 to Rottloff et al. by reaction of bisphenol A and similar bisphenols with a cyanogen halide in isopropanol with a tertiary amine catalyst.

It is known that aromatic dicyanates such as BCP can be heated or catalyzed by zinc chloride or other catalysts to set as a cross-linked polymer which is reasonably translucent, but quite yellow or brown in color. U.S. Pat. No. 4,026,913 to Tanigaichi et al. describes the polymerization of polycarbonates having hydroxy ends converted to dicyanato ends by cyanogen halide which are then polytrimerized with themselves or with monomeric aromatic dicyanates such as BCP to form cross-linked resins. Again, such compositions may be reasonably translucent but are normally quite yellow or brown in color.

U.S. Pat. No. 4,157,360 to Prevorsek and Chung describes thermoformable polymers which are an intimate mixture of a cross-linked polycyanurate network polymer and high molecular weight thermoplastic polymer such as a poly(ester-carbonate). It is described that intimate mixtures of aromatic dicyanate monomers such as BCP with thermoplastic polymers such as poly(ester-carbonates) can be set in fashions conventional for aromatic dicyanates to form interpenetrating network polymers of the thermoplastic finely dispersed in the cross-linked polycyanurate. While this patent describes such materials as having high impact strength, high Vicat softening temperature and good tensile properties, there is no description in the reference of the optical properties of the interpenetrating network polymer. Uses proposed for the interpenetrating network polymer include windscreens such as windshields, canopies, door windows and wire housings. In addition, it is described to deposit the interpenetrating network polymer as a coating on an article such as a wire, a conducting material, glass, poly(ester-carbonate) windshield and structural parts such as supporting beams. It is indicated that the cured composition will improve the abrasion and solvent resistance of the article.

For many applications of polycyanurates, and especially of polycyanurate networks with thermosetting polymers dispersed therein as described in U.S. Pat. No. 4,157,360, it is desirable that the polycyanurate not detract from the optical properties of either the thermosetting material dispersed therein or the substrate upon which the network is deposited. In this regard, conventional polycyanurates contribute excessive color that detracts from their use in windscreens and the like, even as a thin coating deposited on glass or on clear plastics such as polycarbonates and poly(estercarbonates).

BRIEF DESCRIPTION OF THE INVENTION

It has been discovered that careful purification of the aromatic dicyanate monomer can remove materials that contribute color to the polycyanurate network, and especially to the interpenetrating network of thermoplastic polymer dispersed in polycyanurate network. It has also been discovered that the selection of curing catalyst is critical in avoiding color formation. It has been further discovered that the dicyanate should be initially cured at between about 150° and 200° C. to avoid color formation as occurs if cure is initiated above about 200° C., and that cure time at higher temperatures (especially above 200° C.) should be limited.

Accordingly, the present invention includes a process for preparing a cured composition which comprises:
(a) combining a purified monomeric aromatic dicyanate with an effective amount of a catalyst selected from the group consisting of manganese(II), silver(I), iron(III) bismuth(III), indium(III) and hafnium(IV) salts and with a thermoplastic polymer;
(b) curing the aromatic dicyanate initially at at least one temperature at least about 150° C. and below about 200° C.; and
(c) further curing the aromatic dicyanate at at least one temperature between about 200° C. and about 300° C., for a time sufficient to cure the dicyanate without causing such color formation that the Yellowness Index of the cured composition exceeds about 30.

The present invention also includes a process for preparing a cured composition which comprises:
(a) combining a purified monomeric aromatic dicyanate with an effective amount of a catalyst selected from the group consisting of manganese(II), silver(I), iron(III) bismuth(III), indium(III) and hafnium(IV) salts;
(b) curing the aromatic dicyanate initially at at least one temperature at least about 150° C. and below about 200° C.; and
(c) further curing the aromatic dicyanate at at least one temperature between about 200° C. and about 300° C., for a time sufficient to cure the dicyanate without causing such color formation that the Yellowness Index of the cured composition exceeds about 30.

DETAILED DESCRIPTION OF THE INVENTION

Some forms of the present invention relate to materials formed by curing an aromatic dicyanate in admixture with a thermoplastic in the manner of U.S. Pat. No. 4,157,360 or the aromatic dicyanate coated on a thermoplastic or the mixture coated on the same or a different thermoplastic. Other forms of the invention relate to the material formed by curing the aromatic dicyanate alone. The following discussion centers upon the mixture alone or on a thermplastic, but would apply similarly to the product of curing the pure dicyanate, except that permissable times for further curing are generally shorter for the pure dicyanate.

Monomeric dicyanates useful in the present invention include those of the formula NCO-R-OCN as described in U.S. Pat. No. 4,157,360 in columns 3–5. Preferred dicyanates are those wherein R is one of the following:
(a) diphenol moiety;
(b) diphenolester moiety, formed from aromatic dicarboxylic acid and diphenol;
(c) diphenolcarbonate moiety, formed from diphenol and carbonate precursor;
(d) diphenolestercarbonate moiety, formed from aromatic dicarboxylic acid, diphenol and carbonate precursor; or mixtures thereof.

Most preferred are those wherein R is

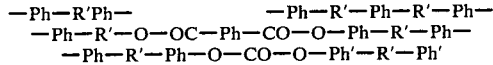

It is preferred in these formulas that Ph be 1,4-phenylene and R' be 2,2-propylidine; although Ph may also be 1,3 phenylene and R' may also be 4,4-phthalein.

The dicyanate monomer used in the present invention should be purified before curing or mixing with thermoplastic. A preferred method of purification is recrystallization with a ketone having melting point below $-25°$ C., such as acetone or methyl ethyl ketone. The recrystallization should be done without warming to temperatures where any substantial trimerization occurs, e.g. without exceeding 35° C. Other purifications, such as by recrystallizing in a hydrocarbon, may be employed with similar results, except that greater care must be exercised to avoid temperatures warm enough for the impurities to catalyze polymerization and color formation.

Unlike the processes of parent application Ser. No. 213,530, the present processes do not employ zinc salts as catalysts. Thus various other salts have been found which give low color products so long as the temperature-time regime of the present process is observed and pure dicyanate materials are used. Suitable salts include manganese(II) chloride, silver nitrate, iron(III) chloride bismuth(III) chloride, indium(III) chloride and hafnium(IV) chloride, and a variety of corresponding salts which are stable and dissolvable in polymer solutions or melts and are generally Lewis Acids. The amount of any catalyst depends on the rate of polymerization desired, but generally levels of 0.001% to 0.1% metal by weight of dicyanate are effective.

If a thermoplastic is used, it can be any thermoplastic, but preferably is one that does not react with the dicyanate, and also preferably contains at least some aromatic moieties.

If the dicyanate is to be combined with a thermoplastic before curing, then in some methods they are mixed as dry solids with the catalyst. In this case the weight ratio of mixed dicyanate to mixed thermoplastic is preferably about 1:9 to about 9:1. The mixture may be applied to the same or different thermoplastic before curing and then cured as described below.

Alternatively the mixture of purified aromatic dicyanate, catalyst and thermoplastic polymer may be coprecipitated from a solution thereof in a solvent for all three such as tetrachloroethane. The solvent may be removed before curing by evaporating at a temperature below either cure temperature or during the cure by heating to the first cure temperature (e.g. 175° C.) and evaporating the solvent. In the latter case, the cure time (generally 0.1–2 h) should be considered to start after the solvent has essentially all evaporated. Where coprecipitation is employed, the weight ratio of coprecipitated dicyanate to coprecipitated thermoplastic is preferably between about 1:9 and about 9:1. In some forms the coprecipitated dicyanate, catalyst and thermoplastic polymer (or dicyanate and catalyst without the thermoplastic polymer) are applied to a thermoplastic substrate before curing, but they may also be applied to other substrates or coprecipitated without a substrate. If applied or coprecipitated on a substrate, the cure generally follows the coprecipitation or application.

The purified aromatic dicyanate and thermoplastic polymer may also be melt blended before curing, generally with the catalyst added with one of the two melts. To avoid curing of the dicyanate before melt blending is completed, it is preferred that the powdered thermoplastic polymer be mixed with a major proportion (e.g. 90%) of the total purified aromatic dicyanate used and then heated to elevated temperatures (e.g. 200° to 230° C.) with mixing. When the mixture becomes homogeneous, the catalyst is then added with the remaining aromatic dicyanate (e.g. 10%) with mixing at a desired cure temperature (e.g. 200° C.). It is preferred to employ the melt blending technique with a catalyst level at the low end of the overall range indicated above to minimize premature cure. The weight ratio of melt blended dicyanate to melt blended thermoplastic is preferably between about 1:9 and about 9:1. Once melt blended, the material may be applied to a thermoplastic substrate, or other substrate such as a wire, before curing.

In all forms of the invention in which a mixture of aromatic dicyanate, thermoplastic polymer and catalyst are applied to a thermoplastic substrate, many preferred forms are those in which the thermoplastic polymer and thermoplastic substrate are formed from the same monomers. This similarity can improve compatability and adhesion. The monomers may be present in the same or similar proportion, but this is not required. The polymer and substrate may be of similar molecular weights, monomer distributions or degrees or branching, but this is not required.

Preferred thermoplastics used either for admixture with the purified aromatic dicyanate, for use as the thermoplastic substrate or for both are aromatic polyesters, aromatic polycarbonates, aromatic poly(ester-carbonates) and aromatic polysulfones. More preferred are the aromatic polycarbonates and poly(ester-carbonates) (also called polyester-carbonates). Preferred poly(ester-carbonates) include those formed from phosgene, bisphenol A and a monomer selected from the group consisting of terephthalic acid, terephthaloyl chloride, isophthalic acid, isophthaloyl chloride and mixture thereof. The monomer is preferably terephthaloyl chloride. Preferred poly(ester-carbonates) also include those formed from phosgene, bisphenol A, phenolphthalein, and terephthalic acid or terephthaloyl chloride. With poly(ester-carbonates) including the preferred ones, the most preferred aromatic dicyanate is 2,2-bis(4-cyanatophenyl)propane ("BCP").

In general it is preferred that the weight ratio of combined aromatic dicyanate to thermoplastic polymer be between about 9:1 and about 1:9, with between about 2:1 and about 1:2 being more preferred.

In addition to being applied as a coating to a thermoplastic, the compositions of the present invention may be used as coatings for wires, structural parts and other materials requiring a tough coating which is not highly yellowed. For these applications, any of the above coating methods, i.e., dry blending, salt blending or precipitation, may be employed. Such coatings may take the form of dicyanate, thermoplastic and catalyst, or may take the form of dicyanate and catalyst.

The curing process used in the present invention, whether or not a thermoplastic polymer or substrate is present, should include cure at at least one temperature at least about 150° C. and below about 200° C., which may be quite short (e.g. 5-10 minutes) or quite long (e.g. several hours), but is preferably in the range of 30 minutes to 2 hours. It is contemplated to apply additional material and repeat the low temperature cure. Following the low temperature cure, the article should be cured at at least one temperature between about 200° C. and 300° C. The times for this second cure depend upon the system being cured, the temperature chosen, the color level desired and the desired degree of curing to achieve a particular hardness, abrasion resistance, mar resistance or other physical property. Generally less than 3 h and more than 1 min total cure time above 200° C. is employed, and times under about 30 minutes are most preferred when no thermoplastic is present.

As shown by Examples 1 and 2, performing a high temperature cure without first performing a low temperature cure increases the discoloration of the thermoplastic. While this Example is based on zinc catalysts, similar results are obtained with the present catalysts. Material which has undergone both cures is also more cured, and thus has better physical properties, than material that has undergone only the same high temperature cure.

As indicated by several of the Examples, and especially Examples 24 and 25, the longer the further curing above about 200° C., the more yellow the cured composition becomes. Since, however, curing occurs faster at these temperatures than color formation (provided than the other steps are followed such as aromatic dicyanate purification and initial cure below about 200° C.), a limited time is available to obtain desirable physical properties without excessive color formation. In many cases these physical properties are equal to the physical properties of highly colored materials which have cured for significantly longer times.

The improved optical properties of materials prepared in accordance with the present invention can be observed by determining a Yellowness Index in accordance with ASTM D1925-70. The physical properties can be measured by a variety of techniques, but for the coatings are generally determined by the Mar Resistance Of Plastics or Falling Grit test of ASTM D673. Other properties such as solvent resistance should also improve as the degree of cure increases. For any system trade-offs between better physical properties and inceased yellowness are encountered. In general, however, either improved physical properties with equivalent optical properties or improved optical properties with equivalent physical properties are achieved with the recrystallization and two-stage cure steps (including limited time above about 200° C.) of the present invention, compared to methods in which one or more of these are not employed.

EXAMPLES 1 AND 2

Samples of 2,2-bis(4-cyanatophenyl)propane (BCP) were placed in an aluminum dish to a level of about 1/16 inch (1.6 mm). The BCP used was purified by dissolving in acetone at room temperature, then filtering the solution and cooling it in Dry Ice, filtering the crystals at −60° C. and washing with −60° C. acetone. This process was usually repeated several (3-5) times. BCP used in later examples was similarly purified. Zinc octoate was added to a level of 0.008% Zn.

One dish was then heated in an oven at 200° C. for 30 minutes. The other dish was heated at 150° C. for 30 minutes and then 200° C. for thirty minutes. Yellowness indices (YI1) were then measured by ASTM D1925-70. The plaque from the first dish had a yellowness index of 88.4. The plaque from the second dish showed a yellowness index of 10.1. Thus discoloration at 200° C. occurs far less if the initial cure is below 200° C.

EXAMPLES 3-6

Comparison of Zinc Catalysts

Four plaques were prepared of purified BCP and 0.01% zinc as zinc chloride (ZnCl) or zinc octoate (ZnOc). The first two were subjected to cure at 150° C. for 60 minutes, then 200° C. for 30 minutes (then YI-1 measured), then 200° C. for 120 minutes (then YI-2 measured), and then 250° C. for 120 minutes (and then YI-3 measured). The results were:

| Example | Catalyst | YI-1 | YI-2 | YI-3 |
|---------|----------|------|------|------|
| 3 | 0.01% ZnCl | 2.8 | 21.4 | 53.4 |
| 4 | 0.01% ZnOc | 9.5 | 27.0 | 64.1 |

The other two were cured at 140° C. for 120 minutes, then 170° C. for 120 minutes and then 250° C. for 120 minutes. The results were:

| Example | Catalyst | YI |
|---------|----------|----|
| 5 | ZnCl | 47.0 |
| 6 | ZnOc | 79.4 |

Under these regimes, zinc chloride outperformed zinc octate.

EXAMPLES 7-13

Various Final Cures

Seven plaques of purified BCP with 0.01% zinc as zinc chloride were cured at 150° C. for 60 minutes, then 200° C. for 30 minutes. The first three plaques were then cured for varying times at 250° C. The last three plaques were then cured for 5 minutes at varying temperatures. The results are shown in Table 1.

TABLE 1

| Example | Cure After 200° C. | YI |
|---------|--------------------|----|
| 7 | 250° C. for 5 min. | 14.6 |
| 8 | 250° C. for 10 min. | 21.4 |
| 9 | 250° C. for 15 min. | 29.6 |
| 10 | none | 7.7 |
| 11 | 250° C. for 5 min. | 10.5 |
| 12 | 275° C. for 5 min. | 28.4 |
| 13 | 300° C. for 5 min. | 45.5 |

These results indicate a rapid increase in color at 250° C. and a more rapid increase at higher temperatures. Nevertheless, if a high degree of cure is required, these short high temperature cures may be desired after precuring at lower temperatures.

Systems With Thermoplastic Present

Based upon zinc chloride catalyzed mixtures of thermoplastics and dicyanates, it has been shown in parent application Ser. No. 213,530 that yellowness indices rise with cure times above 200° C. in a manner similar to the above, except that periods are extended (e.g., a yellowness index may be reached at 250° C. in 30–50 minutes instead of in 15 minutes). It is believed that similar correspondence will occur using the non-zinc catalysts described below.

EXAMPLES 14–21

Non-Zinc Catalysts

To test the ability of metal salts to give low color cured dicyanates when used in this process, three 5 g samples of BCP in aluminum dishes (diameter about 5 cm) were prepared for each salt and 2, 4 and 8 drops (respectively) of a 0.5% solution of the metal salts in DMF was added. The dishes were put in a 150° C. oven and mixed when the BCP had melted. The samples were checked periodically and usually they were removed when the DCB had gotten hard enough that it was no longer tacky, or seven hours had elapsed. They were then put in a 200° C. oven for approximately ¼ of the time they were in the 150° C. oven. The samples that had a YI of less than 30 are listed below. The samples were about 2 mm thick.

| Ex | Catalyst | Drops of Cat. Sol. | Time in 150° C. Oven (Min) | Time in 200° C. Oven (Min) | YI |
|---|---|---|---|---|---|
| 14 | MnCl$_2$ | 2–8 | 120 | 60 | 12–15 |
| 15 | Co(NO$_3$) | 2–8 | 240 | 60 | 9–16* |
| 16 | AgNO$_3$ | 2,4 | 120 | 30 | 19–23 |
| 17 | Ni(OOCCH$_3$)$_2$ | 4,8 | 420 | 100 | 19–24* |
| 18 | FeCl$_3$ | 2 | 140 | 30 | 24* |

*These samples had a color other than yellow so the YI understates their color.

Some metal salts that gave high color under these conditions are FeCl$_2$, SnCl$_2$, SnCl$_4$ and Cr(NO$_3$)$_3$. Some metal salts which were not active enough to be considered useful are HgCl$_2$, MgCl$_2$, AlCl$_3$ and PbCl$_2$. Also not active enough was ethanol.

To test the ability of metal salts other than Zn to give low color cured dicyanates when used in this process, three 10 g samples of BCP in aluminum dishes (diameter 5 cm) were prepared for each salt and 1, 2 and 4 drops (respectively) of a 2% solution of the metal salt in DMF was added. The dishes were put in a 150° C. oven and each was mixed when the BCP had melted. The samples were checked periodically and were removed when the BCP had gotten hard, or 12 hours had elapsed. They were then put in a 200° C. oven for about ¼ the time they were in the 150° C. oven. The samples were about 4 mm thick. Samples whose YI, adjusted to a 2 mm thickness, was less than 30 are listed below.

| Ex. and Catalyst | Drops of Cat. Sol | Time in 150° C. Oven (Min) | Time in 200° C. Oven (Min) | YI Measured | YI Adjusted to 2 mm Thickness |
|---|---|---|---|---|---|
| 19 BiCl$_3$ | 1–4 | 420 to 720 | 30–95 | 11–20 | 5–11 |
| 20 InCl$_3$ | 1–4 | 240 to 420 | 30–65 | 17–37 | 9–21 |
| 21 HfCl$_4$ | 4 | 560 | 90 | 29 | 16 |

(a) Test showed that YI(10 g) = YI(5 g) + YI(5 g)$\left(1 - \frac{YI(5\,g)}{100}\right)$ Thus YI(5 g) = $[1-(1-0.01\,YI(10\,g))^{\frac{1}{2}}]100$ An example of metal a salt that gave high color under these conditions was MoCl$_5$. Examples of metal salts that were not active enough to be tested for low color are TiCl$_4$, TeCl$_4$, OsCl$_3$ and RhCl$_3$.

EXAMPLES 22–24

Based upon mechanical testing, it was determined that dicyanates cured only at 200° C. or only at 150° C. and 200° C. were not as fully cured as materials cured at 250° C. or at 200° C. and at 250° C. (for zinc catalyzed systems as well as for some of these other systems). Accordingly, the four catalysts giving the lowest color and heat cure at 200° C. were tested further: MnCl$_2$, Co(NO$_3$), FeCl$_3$ and Ag(NO$_3$). While nickel acetate produced products with low yellowness indices, these materials were too blue for use in applications where low color was required.

EXAMPLE 22

AgNO$_3$

Purified dicyanate bisphenol A (5 g) was melt blended with 2,4 or 8 drops of freshly prepared silver nitrate in dimethyl formamide (one weight %) and placed in 5.5 cm diameter aluminum weighing dish and then cured for 4 hours at 150° C., then a variable period at 200° C. and finally for 5 minutes at 250° C. The yellowness index was then measured and a sample analyzed by IR as a KBr pellet (comparing absorbance at 2270 against 2220 cm$^{-1}$) to determine the percent unreacted cyanate. The results were as follows:

| Run | Drops of AgNO$_3$ | Time at 200° C.* | YI | % Unreacted Cyanate |
|---|---|---|---|---|
| 22 A | 2 | 30 min. | 21.3 | 18.2 |
| 22 B | 4 | 10 min. | 22.7 | 12.9 |
| 22 C | 4 | 20 min. | 27.0 | 15.4 |
| 22 D | 4 | 30 min. | 28.9 | NM |
| 22 E | 8 | 10 min. | 25.8 | 10.7 |
| 22 F | 8 | 20 min. | 25.8 | 12.3 |
| 22 G | 8 | 30 min. | 30.8 | NM |

*after 4 h at 150° C. and before 5 min. at 250° C.
NM = not measured

EXAMPLE 23

FeCl$_3$

Example 22 was repeated using 1% FeCl$_3$ in dimethyl formamide (1,2 or 4 drops) and various times at 150° C., 200° C. and 250° C. The results were as follows:

| Run | Drops | Minutes at 150° C. | 200° C. | 250° C. | YI | % Unreacted |
|---|---|---|---|---|---|---|
| 23 A | 1 | 5.5 | 22 | 5.5 | 25.1 | 13.7 |
| 23 B | 1 | 5.5 | 40 | 5.5 | 28.6 | 12.7 |
| 23 C | 1 | 5.5 | 22 | 10 | 34.5 | 11.1 |
| 23 D | 2 | 4 | 22 | 5.5 | 28, 34.7* | NM |
| 23 E | 2 | 4 | 40 | 5.5 | 33.9 | NM |
| 23 F | 2 | 4 | 40 | 10 | 36.8 | NM |
| 23 G | 4 | 4 | 22 | 10 | 55.5, 49.6* | NM |
| 23 H | 4 | 4 | 40 | 5.5 | 34.0 | NM |
| 23 I | 4 | 4 | 40 | 10 | 49.6 | NM |

*duplicate readings

It appears that 5 minutes at 250° C. is near the maximum that can be used with this FeCl$_3$ catalyst without exceeding a 30 yellowness index.

EXAMPLE 24

MnCl₂

When Example 22 was repeated with 8 drops of MnCl₂ (1% dimethyl formamide) and the plaques were cured for 4 hours at 150° C., 10–30 minutes at 200° C. and 0, 5, 7.5 or 10 minutes at 250° C., YI values below 30 were uniformly obtained. Infrared showed 15% or more of the cyanate to be unreacted, however. Selected runs are summarized below:

| Run | Time at 150° C. | 200° C. | 250° C. | YI | % Unreacted |
|---|---|---|---|---|---|
| 24 A | 4 h | 10 | 5 | 15.7 | 18.7 |
| 24 B | 4 h | 20 | 7.5 | 20.1 | 15.3 |
| 24 C | 4 h | 20 | 10 | 25.2 | 13.1 |
| 24 D | 4 h | 30 | 5 | 20.7 | 17.3 |
| 24 E | 4 h | 30 | 7.5 | 19.8 | 15.7 |
| 24 F | 4 h | 30 | 10 | 23.1 | 12.7 |

To improve total cure, the catalyst was increased to 10 drops, the time at 150° C. was then extended to 6 hours and the time at 200° C. was also extended. The results were then:

| Run | Time at 150° C. | 200° C. | 250° C. | YI | % Unreacted |
|---|---|---|---|---|---|
| 24 G | 6 h | 20 | 0 | 11.0 | — |
| 24 H | 6 h | 63 | 0 | 15.9 | — |
| 24 I | 6 h | 20 | 5 | 18.3 | — |
| 24 J | 6 h | 20 | 7.5 | 23.4 | — |
| 24 K | 6 h | 63 | 7.5 | 23.6 | 14.5 |
| 24 L | 6 h | 20 | 10 | 25.2 | 11.1 |
| 24 M | 6 h | 63 | 10 | 26.0 | 13.7 |
| 24 N | 6 h | 63 | 12.5 | 26.3 | 13.6 |
| 24 O | 6 h | 63 | 15 | 31.8 | — |
| 24 P | 6 h | 63 | 17.5 | 37.7 | — |
| 24 Q | 6 h | 63 | 20 | 36.0 | — |

It is apparent that after 6 hours at 150° C. and 63 minutes at 200° C., the time permitted at 250° C. is between 12.5 and 15 minutes for this MnCl₂ catalyst. Other runs with 20 hours at 150° C., 16, 36 or 46 hours at 210° C. and 2.5, 5.5, 7.5 or 10.0 hours at 270° C. produced yellowness indices from 17.6 to 49.

COMPARATIVE EXAMPLE 25

When the procedures of Example 22 were repeated with cobalt (I) nitrate, a strong color appeared after the 200° C. cure, such that further curing was not performed.

We claim:

1. A process for preparing a cured composition which comprises:
   (a) combining a purified monomeric aromatic dicyanate with an effective amount of a catalyst selected from the group consisting of manganese(II), silver-(II), iron(III) bismuth(III), indium(III) and hafnium(IV) salts and with a thermoplastic polymer;
   (b) curing the aromatic dicyanate at at least one temperature at least about 150° C. and below about 200° C.; and
   (c) further curing the aromatic dicyanate at at least one temperature between about 200° C. and about 300° C., for a time sufficient to cure the dicyanate without causing such color formation that the Yellowness Index of the cured composition exeeds about 30.

2. The process of claim 1 wherein the purified dicyanate, catalyst and thermoplastic polymer are mixed as dry solids before curing and the weight ratio of mixed dicyanate to mixed thermoplastic is between about 1:9 and about 9:1.

3. The process of claim 2 wherein the mixture of dicyanate, catalyst and thermoplastic polymer is applied to a thermoplastic substrate before curing.

4. The process of claim 1 wherein the purified aromatic dicyanate, catalyst and thermoplastic polymer are coprecipitated from a solution, the solvent is removed before or during curing and the weight ratio of coprecipitated dicyanate to coprecipitated thermoplastic is between about 1:9 and about 9:1.

5. The process of claim 1 wherein the purified aromatic dicyanate and thermoplastic polymer are melt blended before curing and the weight ratio of melt blended dicyanate to melt blended thermoplastic is between about 1:9 and about 9:1.

6. The process of claim 1 wherein the dicyanate and catalyst are mixed and applied to a substrate of the thermoplastic polymer.

7. The process of claim 1 wherein the aromatic dicyanate monomer is of the formula NCO-R-OCN wherein R comprises at least one aromatic moiety and contains 6–40 carbons, in which the aromatic rings may be further substituted by groups, inert during the polymerization, selected from halogen, alkyl of 1–4 carbons, alkoxy of 1–4 carbons and alkyl carboxylic ester of 1–4 carbons.

8. The process of claim 7 wherein R of said compound is a:
   (a) diphenol moiety;
   (b) diphenolester moiety, formed from aromatic dicarboxylic acid and diphenol;
   (c) diphenolcarbonate moiety, formed from diphenol and carbonate precursor;
   (d) diphenolestercarbonate moiety, formed from aromatic dicarboxylic acid, diphenol and carbonate precursor; or mixtures thereof.

9. The process of claim 8 wherein R is:

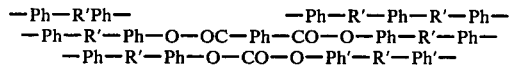

—Ph—R'Ph—          —Ph—R'—Ph—R'—Ph—
—Ph—R'—Ph—O—OC—Ph—CO—O—Ph—R'—Ph—
—Ph—R'—Ph—O—CO—O—Ph'—R'—Ph'— or mixtures thereof; wherein Ph is, independently at each occurrence, 1,4-phenylene or 1,3-phenylene and R' is, independently at each occurrence 2,2-propylidene or 4,4-phthalein.

10. The process of claim 9 wherein said thermoplastic polymer is a poly(ester-carbonate).

11. A process for preparing a cured composition which comprises:
   (a) combining a purified monomeric aromatic dicyanate with an effective amount of a catalyst selected from the group consisting of manganese(II), silver(I), iron(III) bismuth(III), indium(III) and hafnium(IV) salts;
   (b) curing the aromatic dicyanate at at least one temperature at least about 150° C. and below about 200° C.; and
   (c) further curing the aromatic dicyanate at at least one temperature between about 200° C. and about 300° C., for a time sufficient to cure the dicyanate without causing such color formation that the Yellowness Index of the cured composition exceeds about 30.

12. The process of claim 11 wherein the aromatic dicyanate monomer is of the formula NCO-R-OCN wherein R comprises at least one aromatic moiety and contains 6-40 carbons, in which the aromatic rings may be further substituted by groups, inert during the polymerization, selected from halogen, alkyl of 1-4 carbons, alkoxy of 1-4 carbons and alkyl carboxylic ester of 1-4 carbons.

13. The process of claim 12 wherein R of said compound is a:
(a) diphenol moiety;
(b) diphenolester moiety, formed from aromatic dicarboxylic acid and diphenol;
(c) diphenolcarbonate moiety, formed from diphenol and carbonate precursor;
(d) diphenolestercarbonate moiety, formed from aromatic dicarboxylic acid, diphenol and carbonate precursor; or mixtures thereof.

14. The process of claim 13 wherein R is:

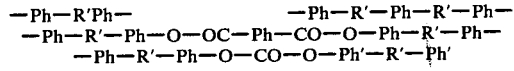

or mixtures thereof; wherein Ph is, independently at each occurrence, 1,4-phenylene or 1,3-phenylene, and R' is, independently at each occurrence, 2,2-propylidene or 4,4-phthalein.

15. The process of claim 14 wherein Ph is 1,4-phenylene and R' is 2,2-propylidene at each occurrence.

16. The process of claim 1, 7, 9, 11, 12 or 14 wherein the catalyst is silver nitrate.

17. The process of claim 1, 7, 9, 11, 12 or 14 wherein the catalyst is iron(III) chloride.

18. The process of claim 1, 7, 9, 11, 12 or 14 wherein the catalyst is manganese(II) chloride.